(12) United States Patent
Levkovitch et al.

(10) Patent No.: US 8,697,202 B2
(45) Date of Patent: Apr. 15, 2014

(54) POLYGONAL SHEET AND A 3D STRUCTURE FORMED THEREFROM

(75) Inventors: Michael Levkovitch, Kfar Bilu (IL); Anat Stein, Givataim (IL); Hadas Kruk, Bnei Brak (IL)

(73) Assignee: Tea and Lemon Ltd., Kfar-Bilu (IL)

( * ) Notice: Subject to any disclaimer, the term of this patent is extended or adjusted under 35 U.S.C. 154(b) by 805 days.

(21) Appl. No.: 12/675,521

(22) PCT Filed: Aug. 28, 2008

(86) PCT No.: PCT/IL2008/001173
§ 371 (c)(1),
(2), (4) Date: Feb. 26, 2010

(87) PCT Pub. No.: WO2009/027982
PCT Pub. Date: Mar. 5, 2009

(65) Prior Publication Data
US 2011/0052838 A1    Mar. 3, 2011

Related U.S. Application Data

(60) Provisional application No. 60/935,739, filed on Aug. 29, 2007.

(51) Int. Cl.
*B65D 5/00* (2006.01)
(52) U.S. Cl.
USPC .......................... 428/12; 428/34.2; 428/542.8
(58) Field of Classification Search
USPC .............. 229/103, 107, 108, 108.1, 109–116, 229/117.13, 155, 188; 428/9, 12, 34.2, 428/542.8; 220/4.01, 4.04, 4.08, 4.22, 4.23, 220/4.29, 9.2, 403, 404; 116/63 C; 47/66, 47/66.1, 66.3, 66.4, 72; D9/430, 431, 663; D11/143, 164; 4/144.4, 484, 483, 449, 4/460; 206/521.9, 523, 586, 822; 248/127, 585
See application file for complete search history.

(56) References Cited

U.S. PATENT DOCUMENTS 2,135,855 A * 11/1938 Snyder .......................... 229/113
2,210,566 A *  8/1940 Bockman ................. 229/117.07
2,849,726 A    9/1958 Vay
3,097,016 A    7/1963 Bigler, Jr.
4,883,179 A * 11/1989 Dionne .......................... 206/523

(Continued)

FOREIGN PATENT DOCUMENTS

FR    2707467 A1    1/1995
FR    2838949 A1    10/2003

(Continued)

OTHER PUBLICATIONS

Machine Translation of Miki, JP 11-243786A, Sep. 1999.*

*Primary Examiner* — Gwendolyn Blackwell
*Assistant Examiner* — Lee Sanderson
(74) *Attorney, Agent, or Firm* — Vorys, Sater, Seymour and Pease LLP; Susanne M. Hopkins

(57) ABSTRACT

A polygonal sheet and a 3D structure formed therefrom, the polygonal sheet having a shape of an annulus sector comprising a first row and a second row, each comprising at least three panels. The 3D structure is formed by folding the sheet along the articulation between the first row and the second row, giving rise to a ridge when in an erect configuration.

12 Claims, 11 Drawing Sheets

(56) References Cited

U.S. PATENT DOCUMENTS

| | | |
|---|---|---|
| 5,187,819 A | 2/1993 | Grimes |
| 5,682,623 A | 11/1997 | Fenoglio |
| 5,682,683 A | 11/1997 | Haimer |
| 5,927,593 A * | 7/1999 | Berkowitz et al. ............ 229/117 |
| 6,047,414 A | 4/2000 | Bailey |
| 6,896,521 B2 | 5/2005 | Underhill et al. |
| 2003/0159207 A1 | 8/2003 | Howell |
| 2004/0010844 A1 | 1/2004 | Adriano |
| 2004/0098800 A1 | 5/2004 | Dandreo et al. |
| 2005/0188455 A1 | 9/2005 | Sharp |
| 2005/0239024 A1 | 10/2005 | Kemp et al. |
| 2006/0150312 A1 | 7/2006 | Gara et al. |
| 2006/0195357 A1 | 8/2006 | Klofta et al. |
| 2006/0264858 A1 | 11/2006 | Roe et al. |
| 2007/0107116 A1 | 5/2007 | Zamberlan et al. |
| 2007/0108258 A1 | 5/2007 | Taylor et al. |

FOREIGN PATENT DOCUMENTS

| | | | |
|---|---|---|---|
| GB | 586918 | 4/1947 | |
| GB | 2 246 705 A | 2/1992 | |
| JP | 11243786 A * | 9/1999 | ............... A01G 9/02 |
| JP | 11243786 A | 9/1999 | |
| WO | 9829019 A1 | 7/1998 | |
| WO | 0059355 A1 | 10/2000 | |
| WO | 2006090178 A1 | 8/2006 | |

* cited by examiner

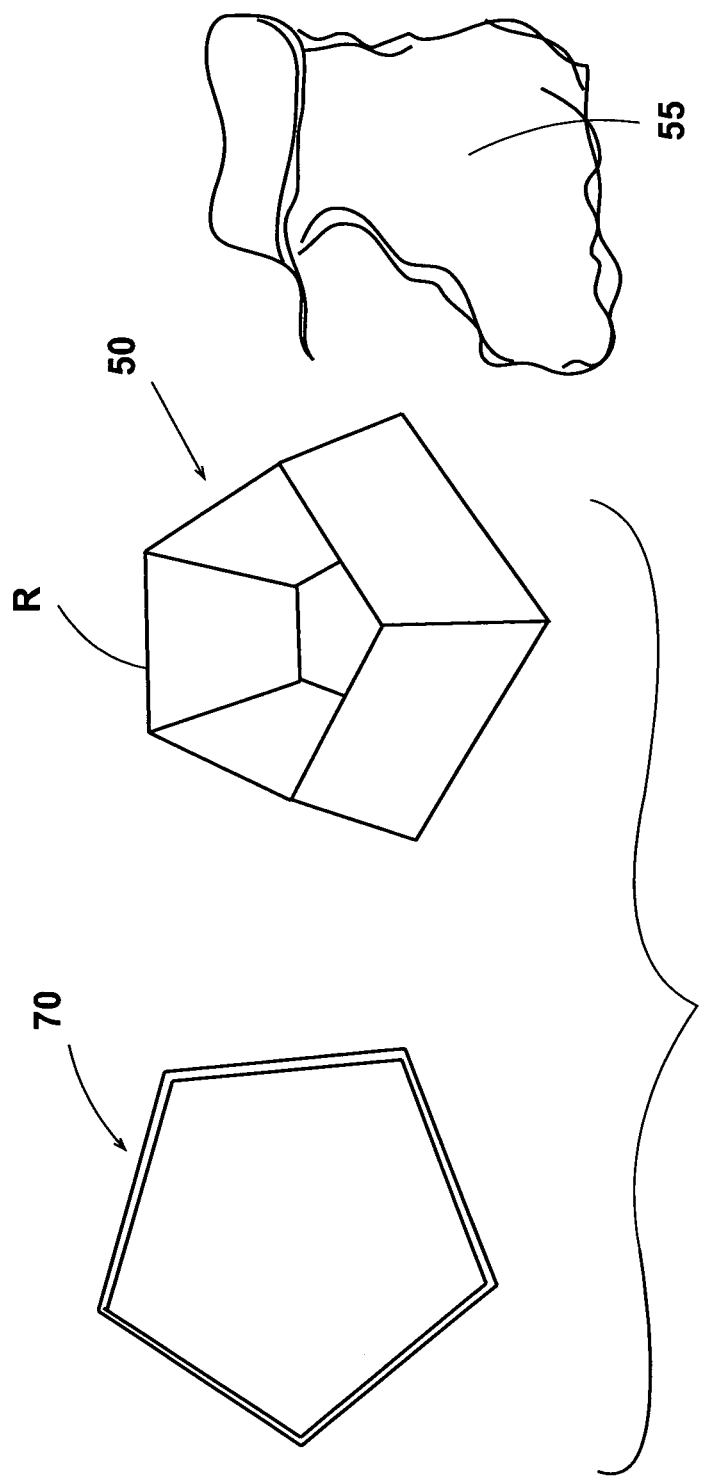

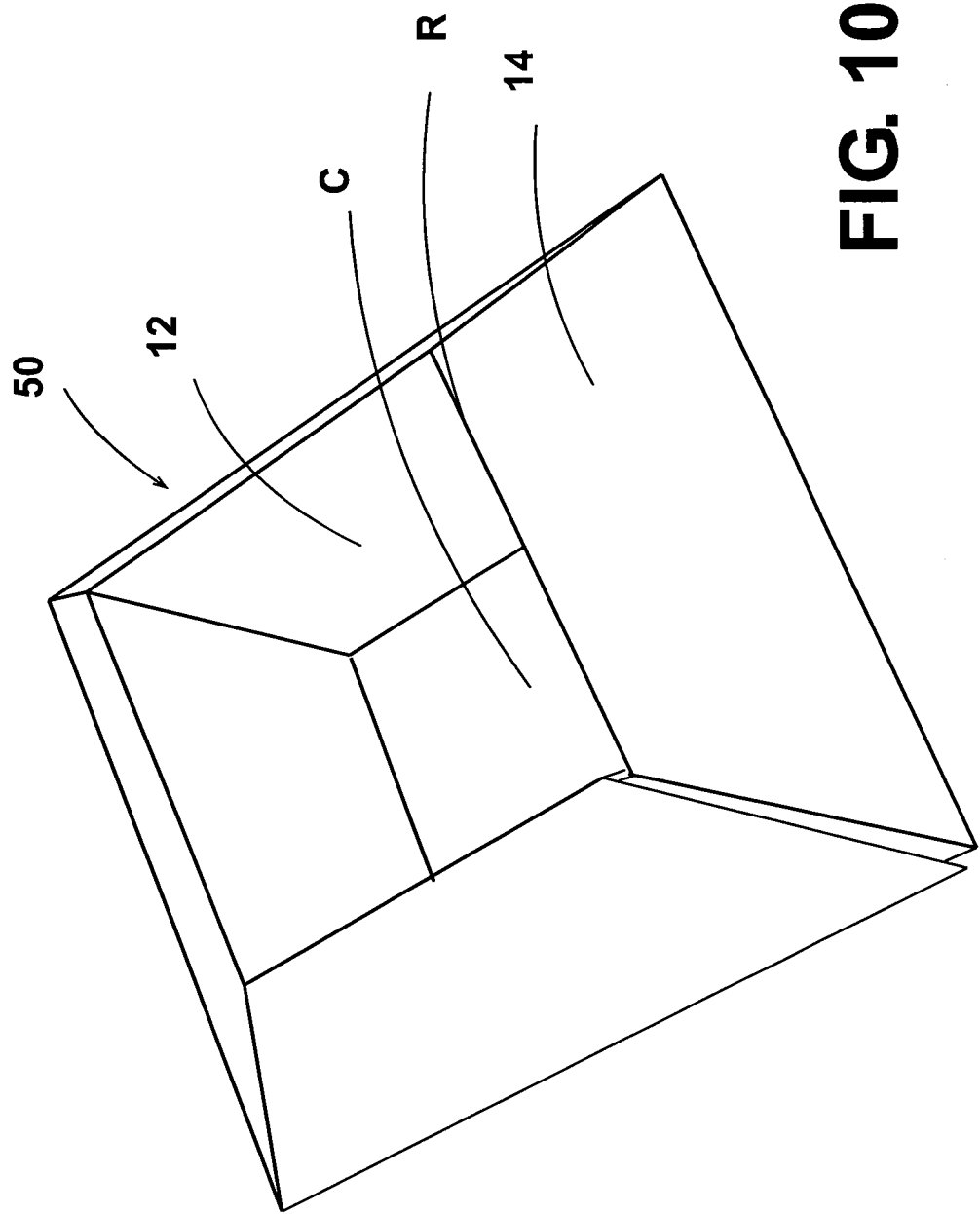

POLYGONAL SHEET AND A 3D STRUCTURE FORMED THEREFROM

This is a National Phase Application filed under 35 U.S.C. 371 as a national stage of PCT/IL2008/001173, filed Aug. 28, 2008, an application claiming the benefit under 35 USC 119 (e) U.S. Provisional Application No. 60/935,739, filed Aug. 29, 2007, the content of each of which is hereby incorporated by reference in its entirety.

FIELD OF THE INVENTION

This invention relates to 3D structures formed of a sheet material and suited for different purposes. The invention is further concerned with the sheet material and method for construction of the structure.

BACKGROUND OF THE INVENTION

Articles of manufacture which are deployable from a collapsed, carrying and storage configuration, into an erect operable configuration are well known. One example of such articles is a portable toilet or a pet feeding bowl and the like which are commonly used during outdoor activities.

Examples of collapsible toilets are disclosed in U.S. Pat. Nos. 5,187,819, 5,682,623 and 6,047,414 and in US Patent Application Publication No. 2006/0150312.

SUMMARY OF THE INVENTION

The present invention relates to polygonal sheet having a shape of an annulus sector and in particular to 3D structure(s) erectable from such a sheet.

According to one aspect of the present invention, there is provided a polygonal sheet having a shape of an annulus sector, comprising a first row and a second row, each comprising at least three panels, each panel having a first edge and a second edge and opposite tapering edges extending therebetween; wherein the at least three panels in each of the first row and the second row are hingedly articulated to one another through their respective tapering edges coinciding with the radius of the annulus; and the panels of the first row and of the second row are further hingedly articulated through the second edge of the first row and the first edge of the second row, respectively.

According to another aspect of the present invention, there is provided a structure having a substantially hollow prismoid shape, said structure erected from a polygonal sheet comprising a polygonal sheet having a shape of an annulus sector, comprising a first row and a second row, each comprising at least three panels, each panel having a first edge and a second edge and opposite tapering edges extending therebetween; wherein the at least three panels in each of the first row and the second row are hingedly articulated to one another through their respective tapering edges coinciding with the radius of the annulus; to and the panels of the first row and of the second row are further hingedly articulated through the second edge of the first row and the first edge of the second row, respectively; and wherein the structure is formed by folding the sheet along the articulation between the first row and the second row, giving rise to a ridge, and wherein the first edge of the first row and the second edge of the second row are substantially leveled and form a base of the structure.

According to an embodiment of this aspect, at least an endmost pair of the radially aligned panels at least partially overlaps at least one of the other pair of the radially aligned panels such as to secure the structure in its erect configuration.

According to another embodiment of this aspect, the structure has an inner cavity defined by the panels of the second row, and an external envelope defined by the panels of the first row.

According to yet an embodiment of this aspect, the ridge of the structure may be straight and a plane defined by said ridge may be substantially parallel to a plane defined by the base.

According to yet another aspect of the present invention, there is provided a kit comprising a polygonal structure having a substantially hollow prismoid shape, said structure erected from a polygonal sheet comprising a polygonal sheet having a shape of an annulus sector, comprising a first row and a second row, each comprising at least three panels, each panel having a first edge and a second edge and opposite tapering edges extending therebetween; wherein the at least three panels in each of the first row and the second row are hingedly articulated to one another through their respective tapering edges coinciding with the radius of the annulus; and the panels of the first row and of the second row are further hingedly articulated through the second edge of the first row and the first edge of the second row, respectively; and wherein the structure is formed by folding the sheet along the articulation between the first row and the second row, giving rise to a ridge, and wherein the first edge of the first row and the second edge of the second row are substantially leveled and form a base of the structure; and a lining element.

According to an embodiment of this aspect, the lining element is a plastic bag. According to another embodiment of this aspect, the lining element is a paper bag.

According to yet an embodiment of this aspect, the kit may further comprise an annular polygonal ring adapted to fit over the polygonal structure and secure the lining element thereto.

According to yet another embodiment of this aspect, the lining element may be fitted with a padding member.

Any one of the following embodiments may apply to any one of the aspects of the invention:
- the sheet is deployable between a flat configuration, a bellows-like configuration and an erect configuration having the shape of a substantially hollow prismoid;
- the panels are hinged to one another through living hinges;
- the polygonal sheet is foldable along the tapering edges of the at least three panels of the first row and the second row such as to assume a folded, bellows-like configuration;
- articulation of each two radially aligned panels extending on the first row and the second row, respectively takes place through an intermediate panel;
- the intermediate panel has a shape of an isosceles such that two neighboring intermediate panels form the shape of a rhombus;
- the articulation between the two rows is fitted with a padding member;
- the sheet is at least partially made of a semi-rigid material;
- the sheet is at least partially made of a rigid though pliable material;
- the sheet is at least partially made of a plastic material;
- the sheet is at least partially made of a paper material
- the sheet is at least partially made of a cardboard;
- the sheet is at least partially laminated;
- the sheet is at least partially made of a cloth;
- the sheet further comprises reinforcing layers;
- the sheet further comprises reinforcing ribs;

the ridge of the structure is shaped by consecutively articulated isosceles shapes such that every two isosceles shapes form a rhombus-like shape;

the ridge has an undulating shape;

the ridge is fitted with a padding member;

further comprising at least one fastening arrangement for securement of the folded sheet in its erect configuration;

an endmost one of the panels in at least the first row is provided with a fastening arrangement for securement to the other endmost panel in said row;

fastening arrangement comprises a tongue on the endmost one of the panels and a tongue receiving notch in one of said at least three panels;

fastening arrangement includes a flap on said one endmost panel adapted to be adhered to said other endmost panel;

the 3D structure may be used as:
- a pot holder for plants;
- as a feeding/water bowl for pets;
- as a mold (e.g. cake mold) such that either the inner space formed between the rows or the cavity defined by the second row is used;
- as a lining for a mold;
- as a chamber pot for use in the outdoors or indoors as desired; etc.

a portion of at least one of the endmost panels is diagonally cut.

BRIEF DESCRIPTION OF THE DRAWINGS

In order to understand the invention and to see how it may be carried out in practice, embodiments will now be described, by way of non-limiting examples only, with reference to the accompanying drawings, in which:

FIG. 5 is an illustration of a kit according to one embodiment of the present invention illustrating the 3D structure, a lining bag and an annular connector according to one example of the present invention;

FIGS. 9 and 10 are an illustration of the 3D structures according to some embodiments of the present invention in the ready-to-use form.

DETAILED DESCRIPTION OF EMBODIMENTS

Figure 1:
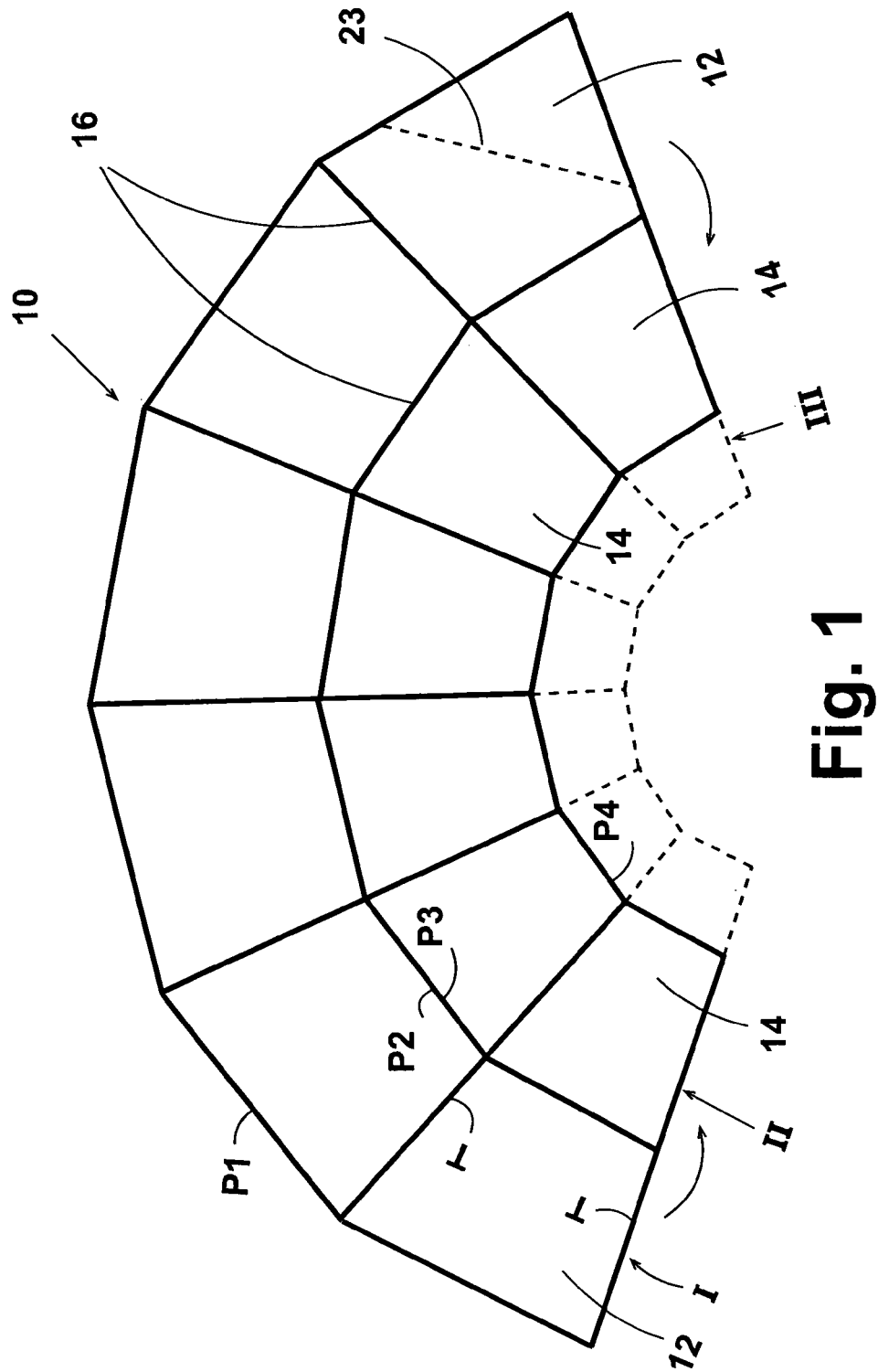
FIG. 1 is an illustration of a polygonal sheet material in a deployed configuration, according to one embodiment of the present invention.

FIG. 1 of the drawings illustrates a sheet material, generally designated 10 having a substantially polygonal shape. The sheet material is constructed of a plurality of pivotally articulated panels 12 and 14. As can be seen in FIG. 1 the panels are pivotally articulated both horizontally and vertically. The panels 12 and 14 are vertically connected forming two rows I and II, respectively, as illustrated, or may be connected to form three rows of articulated panels (row III illustrated by dashed lines in FIG. 1).

It is appreciated that the terms 'horizontally' and 'vertically' mentioned herein are used for sake of convenience in order to describe the sheet material at its deployed, substantially flat position.

The number of panels along the horizontal line may vary from three to any number desired, depending on what geometrical shape, i.e., triangular (shown in FIG. 9), quadrangular (shown in FIG. 10), pentagonal (shown in FIG. 3a) etc., of 3D structure as desired. The number of panels along the vertical line may vary from two to three, or more, in other cases, for at least some radial segments of the sheet material.

The sheet material may be made of a semi-rigid, rigid though pliable material such as plastic material, metal material, paper material such as cardboard, laminated paper or cloths, or combinations thereof, with or without reinforcing layers, and/or ribs etc.

The panels 12, 14 of the multi panel sheet 10 may be connected through a living hinge 16 ('integral hinge'), such as folds or fold assisting perforations (not shown) which will permit the sheet material to be folded about a line into a desired configuration.

The sheet material 10 in FIG. 1 is of a relatively polygonal configuration such that each panel 12 in a first row I is shaped with two substantially parallel edges P1 and P2 and two tapering edges T, wherein edge P2 is shorter than edge P1. The panels 14 in row II are similarly shaped, each having parallel edges P3 and P4, wherein edges P3 and P4 are parallel to each other and to edges P1 and P2 and further wherein edge P4 is shorter than edge P3 which is equal in length to edge P2.

The panels 12, 14 are horizontally coupled along the tapering edges T thereof and vertically coupled through the edges P2 and P3, which in the present example coincide.

Figure 6:
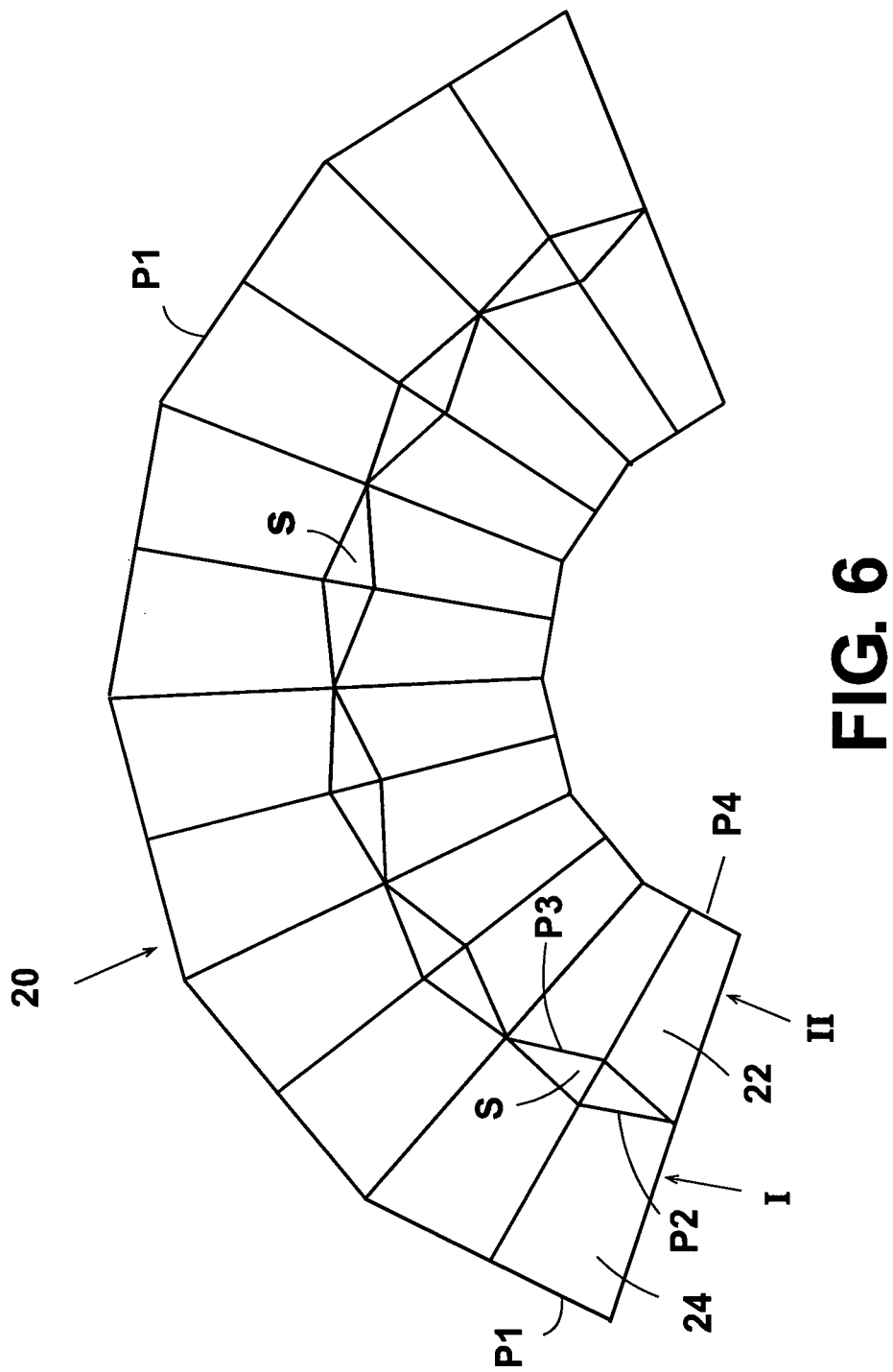
FIG. 6 is an illustration of a sheet material in a deployed/flat configuration, according to another embodiment of the present invention.

In FIG. 6 a sheet 20 is similar to the exemplified sheet of FIG. 1, with a modification of having an additional intermediate panel S between the articulation of each two radially aligned panels 22 and 24 extending on the first row I and the second row II. According to this example the intermediate panel S has a shape of an isosceles and each two neighboring intermediate panels form the shape of a rhombus.

The general appearance of the sheet material 10 and 20 resembles an annulus sector, wherein the tapering edges T radially extend from a common imaginary center point of an annulus, and wherein edges P1 constitute together an outer arch of the sector and edges P4 constitute together an inner arch of the sector (however, said arches according to this example are constructed of linear segments i.e. edges P1 and P4). According to a variation of the invention, at least the edges P1 may be curved, thus providing an outer arch having undulating appearance.

A portion of at least one of the outer panels e.g. edges of row I, on either side of the sheet material may be diagonally cut as schematically illustrated by a segmented line 23 on FIG. 1.

Figure 2A:
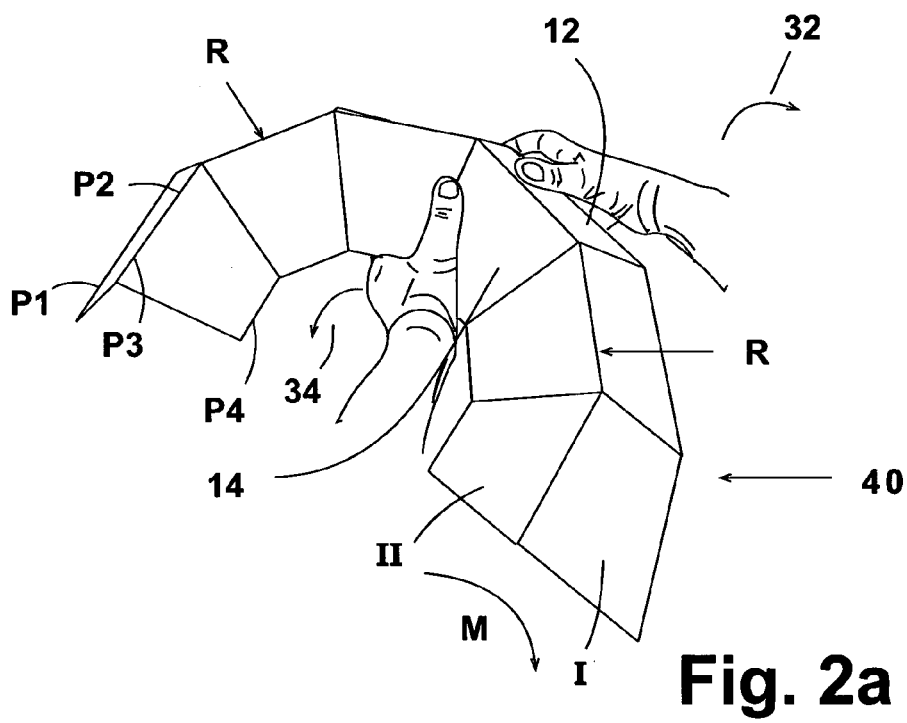
FIG. 2a is an illustration of a folding step according to one embodiment of the present invention, using the sheet material of FIG. 1.
Figure 2B:
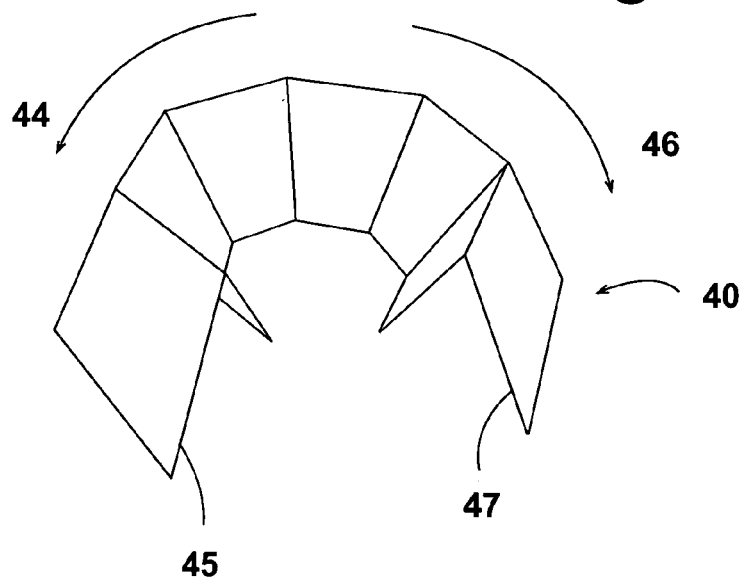
FIG. 2b is an illustration of another step in a method of construction of a 3D structure according to one embodiment of the present invention.

Reference is now made to FIGS. 2a and 2b in which a method of constructing a polygonal 3D structure is illustrated. A sheet 40 according to FIG. 1 is obtained and the two rows I and II of panels are folded by a mountain fold as indicated by arrow M (FIG. 2a), giving rise to a top ridge R. As illustrated in FIG. 2a it is sufficient to fold the sheet by gripping opposite panels 12 and 14 and folding them as illustrated in FIG. 2a and exemplified by arrows 32 and 34 in a mountain type fold M. As can be seen in FIG. 2b, the next step after folding of the sheet using mountain fold M two outer edges 45 and 47 of the deployed and folded sheet 40 are brought together in direction of arrows 44 and 46, so as to form a closed polygonal structure having a central well-like cavity extending from the top ridge R (conforming with the edges P2 and P3) towards a base formed of the edges P1 and P4, now substantially leveled.

Figure 8:
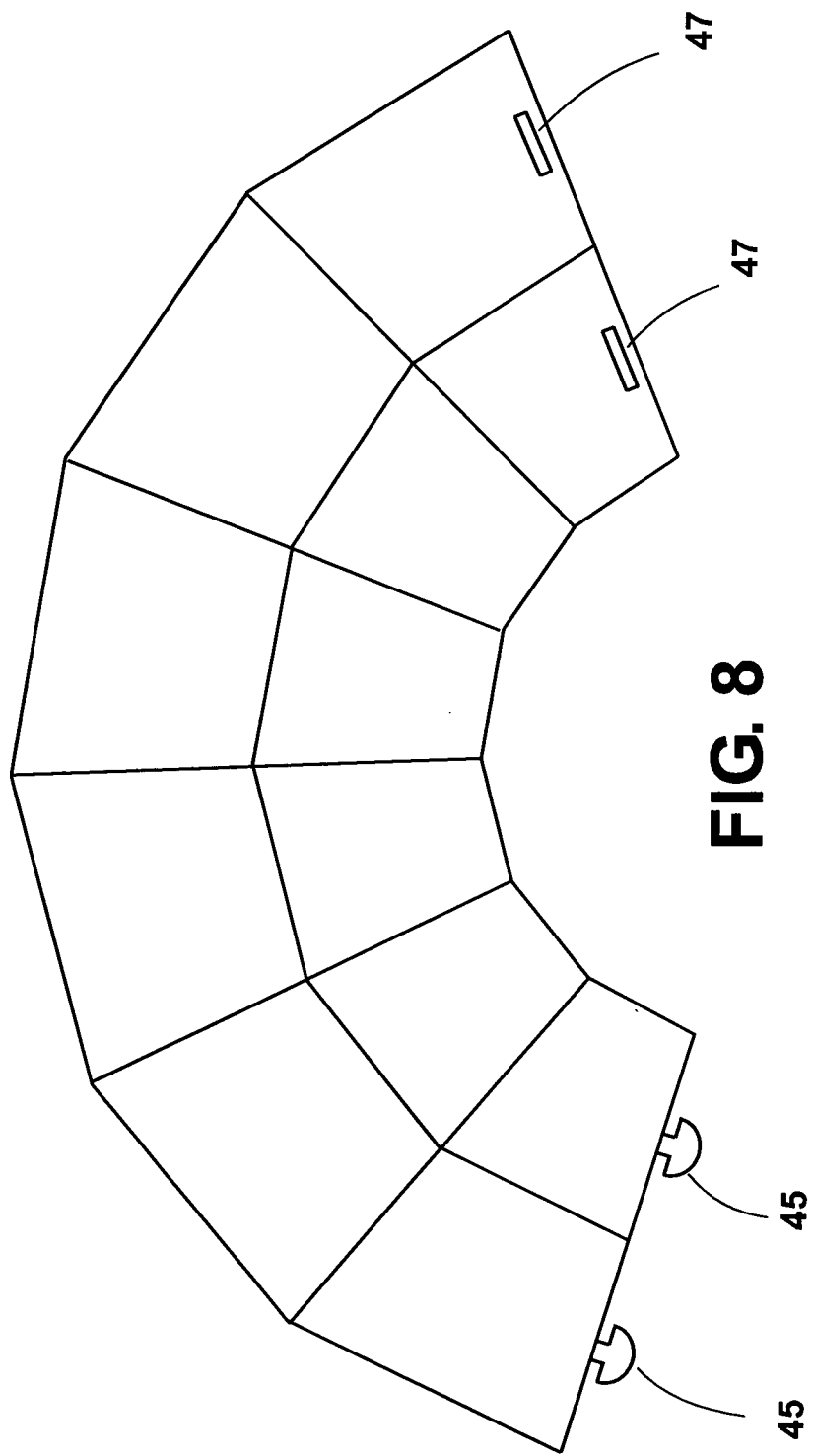
FIG. 8 is an illustration of a sheet material in a deployed configuration with a fastening arrangement, according to one embodiment of the present invention.

The structure may be maintained in its assembled, erect configuration by different arrangements, i.e., adhesives, snap-type couplers, hook and pile fastener/s or protrusions 45 formed at one of the edges fitted for arresting by corresponding incisions 47 formed on an opposite edge (as illustrated in FIG. 8 showing a sheet material at its flat configuration). According to another example of the invention (not shown) one of the endmost panels is formed with a tongue and one of the panels is formed with a tongue receiving notch.

Figure 3A:
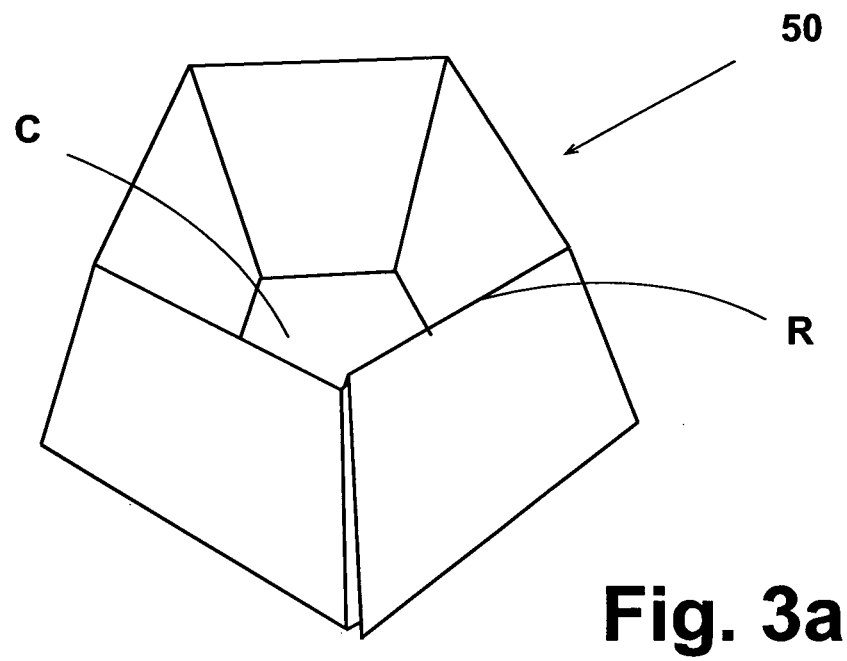
FIG. 3a is an illustration of a 3D structure according to one embodiment of the present invention in its ready-to-use form.

According to another example in order to increase rigidity and stability of the structure in its erect configuration, the edges, after being brought together, are further displaced such that these overlappingly coincide and secure the structure in its polygonal 3D form shown in FIG. 3a without the need in fastening arrangements. However, a fastening arrangement may be applied in this case as well for fixating the structure at its erect configuration.

Figure 4A:
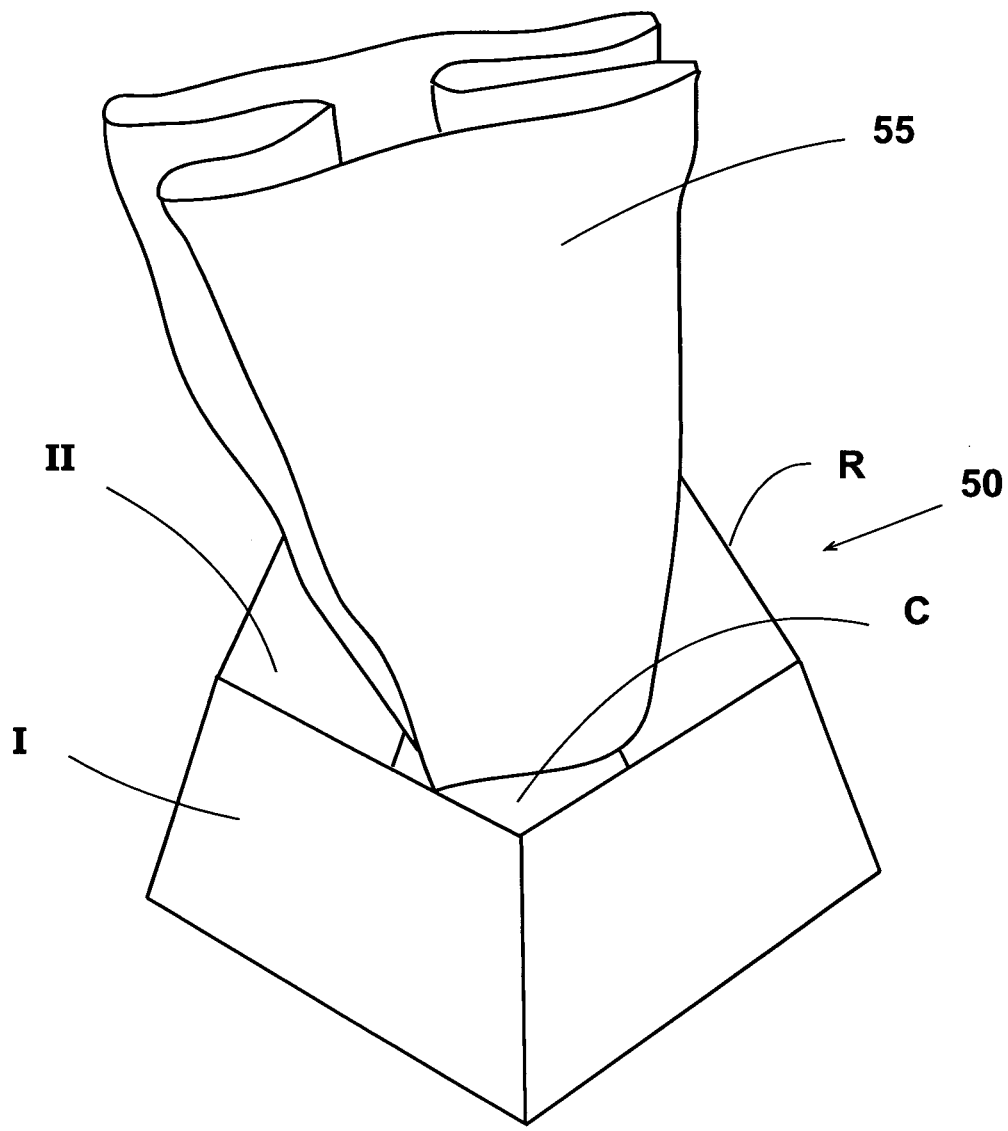
FIGS. 4a and 4b are illustrations of the 3D structure according to one embodiment of the present invention with a fluid-retaining lining being fitted thereto.

According to still a modification of the invention shown in FIG. 10 a further step is performed after erecting the construction wherein a further couple of panels from each edge overlapingly coincide. This imparts the construction 50 with even further rigidity and stability to retain its erect configuration whereby it is unlikely to spontaneously deploy. While in its erect configuration, an inner cavity C (seen for example in FIGS. 3a, 4a and FIG. 10) is defined by the panels 14 of row II of the sheet and the external perimeter, i.e., the external envelope, is defined by the panels 12 of the first row I.

The sheet material illustrated in FIG. 6 is useful in erecting a construction 60 wherein rather than pointed, linear ridges (R in FIG. 3a), planar portions 52 each having an appearance of a rhombus are created and the ridge has an undulated appearance such that the articulation between the bases of the isosceles form a valley and the articulation between the apexes of the isosceles shaped panels form the hill. This construction 60 may be suitable if the structure will be used as a chamber pot and wherein the planar portions better conform to the buttocks of an individual using it.

Figure 3B:
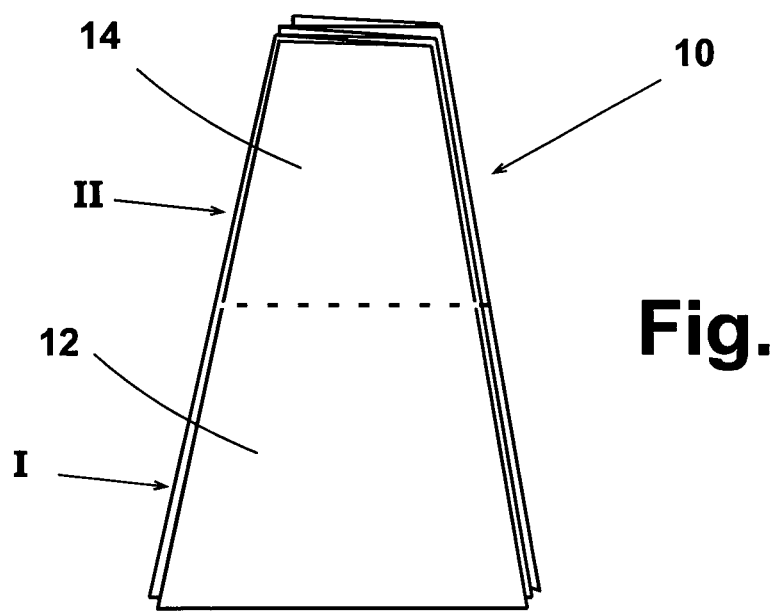
FIG. 3b is an illustration of the sheet material of FIG. 3a in its collapsed/folded configuration.
Figure 7A:
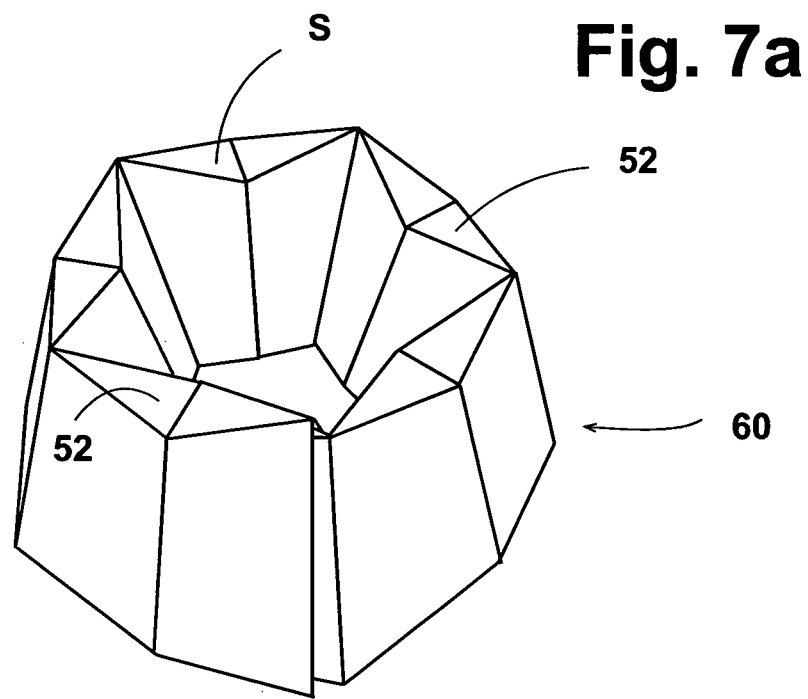
FIG. 7a is an illustration of a 3D structure according to an embodiment of the present invention in its ready-to-use form.
Figure 7B:
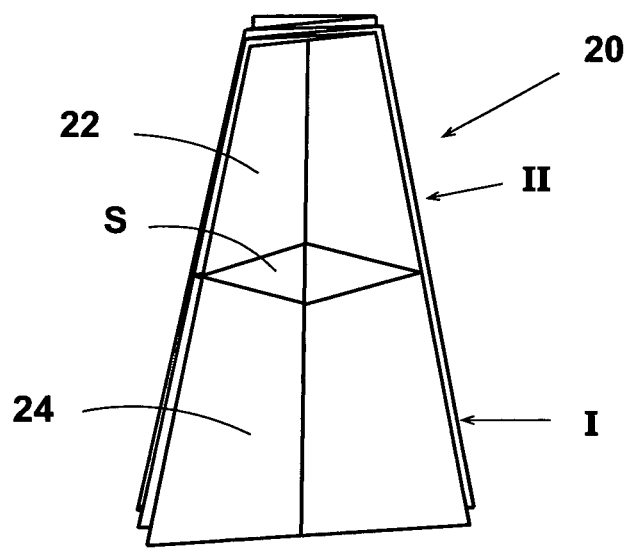
FIG. 7b is an illustration of the sheet material of FIG. 7a in its substantially collapsed/folded configuration.

It is also noted in FIGS. 3b and 7b, that the sheet material can be folded into a compact mountain valley mountain bellows-like configuration for easy and minimal space consuming storage, transfer etc.

The construction according to the present invention may be used for several purposes. For example, the construction may be used as a pot holder for plants, as a feeding/water bowl for pets, as a mold or a lining for a mold such that either the inner space formed between the rows or the cavity defined by the second row is used or according to a specific example of the present invention, it may be used as a chamber pot for use in the outdoors or indoors as desired. If the 3D structure of FIG. 3a is to be used as a chamber pot, ridge R of the structure may be provided with padding for extra comfort to the user. Such padding may be detachably attachable for cleaning purposes.

Figure 4B:
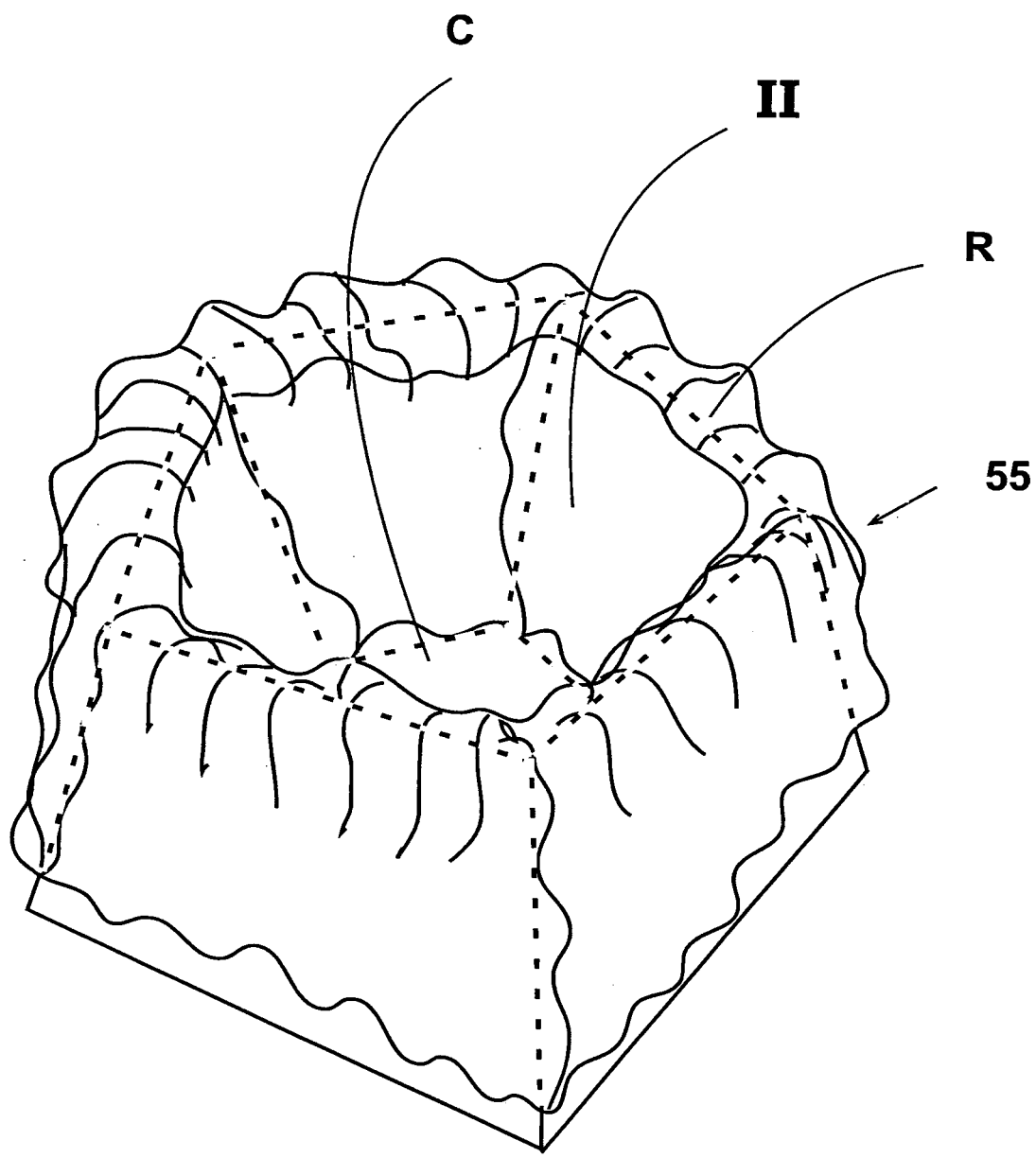

The chamber pot 50 may be further provided with disposable fluid impervious lining bag made of a flexible plastic material for example. In case the structure is to be used as a chamber pot, lining bag 55 (FIG. 4a) may be provided with fluid absorbent pad (not shown) incorporated internally. The lining bag 55 is fitted into the cavity provided by the inner panels II, and will be fitted as shown in FIG. 4b over the ridge R portion of the construction so as to reside as mentioned above within the polygonal cavity C defined by the inner panels II of the structure. The lining bag may be a priory included with the sheet of material. It may also serve for enveloping a consumed device in a hygienic manner for disposal thereof.

According to one example, the top portion of the liner may be padded where it overlies the ridge R of the construction panels. After use the disposable lining bag 55 can be sealed by means of integral sealing strip for example for disposal and the chamber pot can again be folded such as to provide a generally flat configuration for carrying and storing when not in use as shown in FIG. 3b. The lining bag may be secured over the pot 50 by various arrangements known in the art, i.e. an elastic band.

The system shown in FIG. 5 is similar to the one defined with reference to FIG. 3b however according to a further example of the present invention, the construction may further be provided with an annular polygonal ring 70 which is dimensioned to fit over the ridges R of the construction, for example, for securing the lining bag over the construction or such ring may be provided with padding as discussed above, a disposable or reusable fluid impervious lining bag etc.

Figure 9:
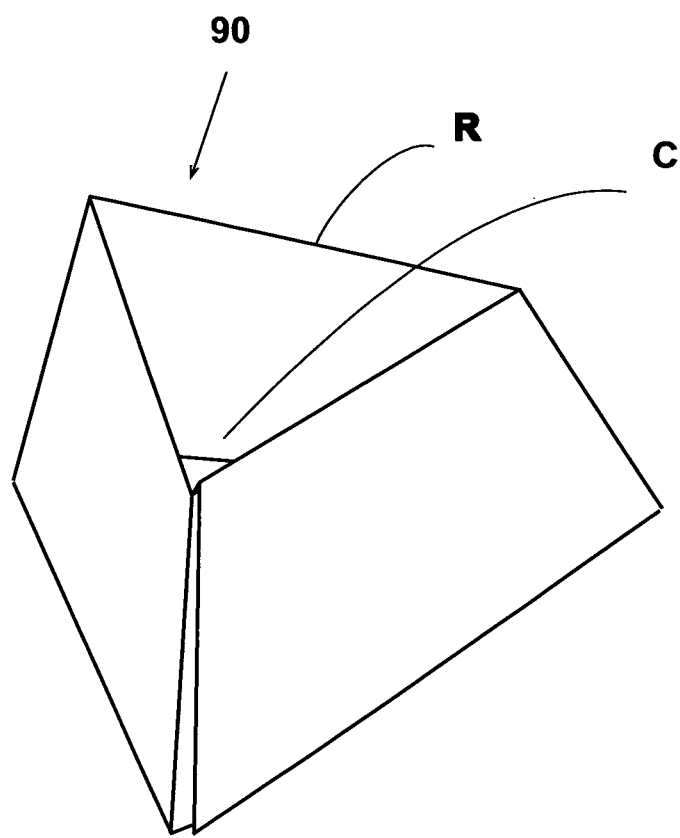

It should be appreciated that although the description relates to a pentagonal construction the same sheet used for production of the pentagonal construction may be used for production of a quadrangular construction (FIG. 9).

Those skilled in the art to which this invention pertains will readily appreciate that numerous changes, variations and modifications can be made without departing from the scope of the invention mutatis mutandis. Furthermore, the invention is not restricted to a particular use and the aforementioned examples are provided for illustrative purposes.

The invention claimed is:

1. A polygonal sheet having a shape of an annulus sector, comprising:
  a first row of panels; and
  a second row of panels,
  each of the first row of panels and the second row of panels comprising at least three panels, each panel having a first edge and a second edge and opposite edges extending at an angle therebetween, wherein
  the at least three panels in each of the first row of panels and the second row of panels are hingedly articulated to one another through an integral hinge at their respective angled edges, said edges coinciding with the radius of the annulus, and
  the panels of the first row of panels and the second row of panels are further radially, hingedly articulated through integral hinges,
  the polygonal sheet further comprising an intermediate row of at least three intermediate panels, articulated respectively to the first row and the second row of panels, each of the intermediate panels having a shape of an isosceles triangle such that two neighboring intermediate panels form the shape of a rhombus, the polygonal sheet being foldable along the articulation between the first row of panels, the intermediate row of intermediate panels, and the second row of panels, to form a substantially planar ridge, and wherein the first edge of the first row of panels and the second edge of the second row of panels are substantially leveled and form a base of a structure and the folded polygonal sheet has an inner cavity defined by the panels of the second row of panels and an external envelope defined by the panels of the first row of panels.

2. The sheet according to claim 1, wherein the polygonal sheet is foldable along the angled edges of the at least three panels of the first row of panels and the second row of panels such as to assume a folded, bellows like configuration.

3. The sheet according to claim 1, wherein the sheet further comprises reinforcing layers or ribs.

4. The sheet according to claim 1, deployable between a flat configuration, a bellows-like configuration and an erect configuration formed into a substantially hollow prismoid.

5. The sheet according to claim 1, wherein at least an endmost pair of the radially aligned panels overlaps at least partially at least one of the other pair of radially aligned panels such as to secure the structure in an erect configuration.

6. The sheet according to claim 1, wherein the substantially planar ridge is straight and the plane of the said ridge is parallel to a plane defined by the base.

7. The sheet according to claim 1, wherein the ridge is fitted with a padding member.

8. The sheet according to claim 1, further comprising at least one fastening arrangement for securement of the folded sheet in an erect configuration.

9. A kit, comprising:
a. a polygonal sheet in accordance with claim 1; and
b. a lining element.

10. The kit in accordance with claim 9, further comprising an annular polygonal ring adapted to fit over the structure and secure the lining element thereto.

11. A structure having a substantially hollow prismoid shape, said structure erected from a polygonal sheet having a shape of an annulus sector, said sheet comprising:
a first row of panels and a second row of panels, each of the first row of panels and the second row of panels comprising at least three panels, each panel having a first edge and second edge, and opposite edges extending at an angle therebetween,
wherein the at least three panels in each of the first row of panels and the second row of panels are hingedly articulated to one another through an integral hinge at their respective angled edges coinciding with the radius of the annulus, and the panels of the first row of panels and the second row of panels are further hingedly articulated through integral hinges, and
the polygonal sheet further comprising an intermediate row of at least three intermediate panels, articulated respectively to the first row and the second row of panels, each of the intermediate panels having a shape of an isosceles triangle such that two neighboring intermediate panels form the shape of a rhombus, the polygonal sheet,
wherein the structure is formed by folding the sheet along the articulation between the first row of panels, the intermediate row of intermediate panels, and the second row of panels, to form a substantially planar ridge, and wherein the first edge of the first row of panels and the second edge of the second row of panels are substantially leveled and form a base of the structure.

12. A polygonal sheet having a shape of an annulus sector, comprising:
a first row of panels comprising at least three panels;
a second row of panels comprising at least three panels; and
an intermediate row of intermediate panels comprising at least three panels, the intermediate row of panels disposed between the first row of panels and the second row of panels, and each intermediate panel having a shape of an isosceles triangle such that two neighboring intermediate panels form the shape of a rhombus,
each panel of the first row of panels and the second row of panels having a first edge and a second edge and opposite edges extending at an angle therebetween, and each panel of the intermediate row of panels having a first edge and a second edge extending at an angle therebetween from a common vertex, and
the at least three panels in each of the first row of panels and the second row of panels are hingedly articulated to one another through an integral hinge at their respective angled edges, said edges coinciding with the radius of the annulus, and
the panels of the first row of panels and the second row of panels are further radially, hingedly articulated through an integral hinge at the second edge of the first row of panels and the second edge of the intermediate row of panels and an integral hinge at the first edge of the intermediate row of panels and the first edge of the second row of panels,
the polygonal sheet being foldable along the articulation between the first row of panels, the intermediate row of intermediate panels, and the second row of panels, to form a substantially planar ridge, and wherein the first edge of the first row of panels and the second edge of the second row of panels are substantially leveled and form a base of a structure and the folded polygonal sheet has an inner cavity defined by the panels of the second row of panels and an external envelope defined by the panels of the first row of panels.

* * * * *